United States Patent [19]

Tanaka

[11] 4,450,399

[45] May 22, 1984

[54] INDUCTION MOTOR

[75] Inventor: Masaru Tanaka, Hyogo, Japan

[73] Assignee: Sanyo Electric Co., Ltd., Moriguchi, Japan

[21] Appl. No.: 383,310

[22] Filed: May 28, 1982

[30] Foreign Application Priority Data

Jan. 27, 1982 [JP] Japan .................................. 57-12431
Feb. 9, 1982 [JP] Japan ............................ 57-10937[U]

[51] Int. Cl.³ .............................................. H02P 5/40
[52] U.S. Cl. ................................ 318/814; 318/345 D; 318/345 H; 318/729
[58] Field of Search ............... 318/729, 814, 815, 816, 318/817, 345 D, 345 H, 798, 806

[56] References Cited

U.S. PATENT DOCUMENTS

| 602,920 | 4/1898 | Steinmetz | 318/729 |
| 602,921 | 4/1898 | Steinmetz | 318/729 |
| 1,478,012 | 12/1923 | Varley | 318/729 |

Primary Examiner—David Smith, Jr.
Attorney, Agent, or Firm—Darby & Darby

[57] ABSTRACT

An induction motor comprises a main winding (41) and an auxiliary winding (42) wound in slots of a stator with proper intervals, the main winding (41) and the auxiliary winding (42) being connected to an alternating current voltage source (1) through a conduction control circuit (20). A control winding (9) is electromagnetically coupled to the main winding (41), with the same shunted by a capacitor (10) so that a closed loop may be formed.

14 Claims, 15 Drawing Figures

INDUCTION MOTOR

BACKGROUND OF THE INVENTION

1. Field of the Invention

The present invention generally relates to an induction motor. More specifically, the present invention relates to an induction motor being supplied in a field winding with a voltage from an alternating current voltage source, while the effective value of the voltage is controlled by means of a phase control circuit or a chopper circuit.

2. Description of the Prior Art

FIG. 1 is a schematic diagram showing one example of a conventional induction motor circuit which constitutes the background of the present invention. An alternating current voltage source 1 is coupled through a conduction control circuit 2 and a switch 3 of a field winding 4 of an induction motor. The field winding 4 comprises a main winding 41 and an auxiliary winding 42. A capacitor 5 is connected in series with the auxiliary winding 42. Although not shown in FIG. 1, a rotor is provided in association with the field winding 4, as well known. Thus the FIG. 1 circuit forms a so-called capacitor run motor, in which a phase advancing current is caused to flow by means of the capacitor 5, whereby a starting torque is generated, and the capacitor is maintained as connected even after the start. A conduction control circuit 2 comprises a switching element 21 such as a bidirectional conductive element having a control electrode (triac) and a triggering circuit, not shown, is connected to the gate of the triac 21. A series connection of a resistor 22 and a capacitor 23 is connected in parallel with the triac 21 for the purposes of preventing erroneous ignition or triggering of the triac 21. When a switch 3 is turned on, the field winding 4 is supplied with an alternating current voltage (shown by the solid line curve V in FIG. 2) the conduction phase of which is controlled by the conduction control circuit 2. The magnitude of the field magnetic flux and thus the rotational speed can be continuously changed by changing the phase of a triggering pulse being supplied from the triggering circuit, not shown.

Since an alternating current voltage is suddenly supplied by the conduction control circuit 2 in the conventional induction run motor circuit shown in FIG. 1, a waveform distortion was caused on the occasion of conduction of the triac 21, as shown by the solid line curve V in FIG. 2. Hence, a problem was involved that due to harmonic components included in the distorted waveform vibration is caused in the motor and a noise is generated from the motor. Furthermore, since the field winding 4 has an inductance component, a surge voltage on the occasion of turn-off of the triac 21 becomes high and therefore a protecting circuit becomes necessary, while a phase lag of a current I flowing through the field coil 4 is caused with respect to the applied voltage V, as shown in FIG. 3, with the result that the efficiency and the power factor is decreased. More specifically, the field current I lags by $\alpha = \omega t$: $\omega$ is the angular frequency of the alternating current voltage source 1 as compared with the voltage V, as shown in FIG. 3, and the above described lag degraded the power factor.

Such a noise as described above would be extremely aggravated when such motor is employed as a prime mover of an electric fan or the like. More specifically, when the effective voltage being applied to the field winding 4 is decreased by means of the conduction control circuit 2 so that the number of revolutions may be decreased, wind singing by a fan is decreased as a matter of course and accordingly a noise due to harmonic distortion becomes more offensive to the ears.

FIG. 4 is a schematic diagram of another conventional induction motor circuit. The FIG. 4 conventional example is disclosed in Japanese Patent Publication No. 18415/1969 published for opposition Aug. 12, 1969 and comprises a tertiary winding or a control winding 6 electromagnetically coupled to the field winding 4, so that a tank circuit may be formed with the control winding 6 and the capacitor 7. A variable resistor 8 is connected in series or parallel with the capacitor 7 in the tank circuit. By adjusting the resistance value of the variable resistor 8, an input current to the tank circuit is controlled, so that a speed control may be made. Since the FIG. 4 conventional example does not employ a conduction control, the same does not cause a noise due to harmonic distortion as encountered in the FIG. 1 conventional example; however, since the peak value itself of the field flux is changed by changing the input current to the tank circuit, another problem is involved that the efficiency of the motor is degraded and a desired starting torque can not be attained according to the circumstances. The FIG. 4 conventional example involves a further problem that since the same does not achieve a speed control by a conduction control no attention has been given to a noise encountered in the FIG. 1 conventional example, which makes it impossible to apply such a circuit as shown in FIG. 4 to such a circuit as shown in FIG. 1. The reason is that the FIG. 4 conventional example achieves a speed control by means of the variable resistor 8 whereas the FIG. 1 conventional example achieves a speed control by means of the conduction control circuit 2.

SUMMARY OF THE INVENTION

Accordingly, a principal object of the present invention is to provide an improved induction motor wherein an applied voltage is controlled by means of a conduction control circuit and a caused noise is reduced as much as possible.

An induction motor in accordance with the present invention comprises a field winding connected to an alternating current voltage source through a conduction control circuit, a control winding electromagnetically coupled to the field winding, and a closed loop means for allowing for a flow of an induction current to the control winding.

According to the present invention, a harmonic component caused due to abrupt conduction of an alternating current voltage by a conduction control circuit can be drastically decreased and accordingly a noise generated from a motor can be effectively reduced.

In principle, the present invention can be applied to any type of induction motor. Accordingly, the present invention can be applied to not only a capacitor run motor, but also to a capacitor starting type induction motor, an induction motor having a shading coil, a split phase starting type induction motor and the like. The present invention can also be applied not only to a single phase induction motor but also to a three phase induction motor.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7 and 8 are vector diagrams for explaining the operation of the FIG. 5 embodiment, in which FIG. 7 is that of the FIG. 1 conventional example and FIG. 8 is that of the FIG. 5 embodiment;

DESCRIPTION OF THE PREFERRED EMBODIMENTS

Figure 5:
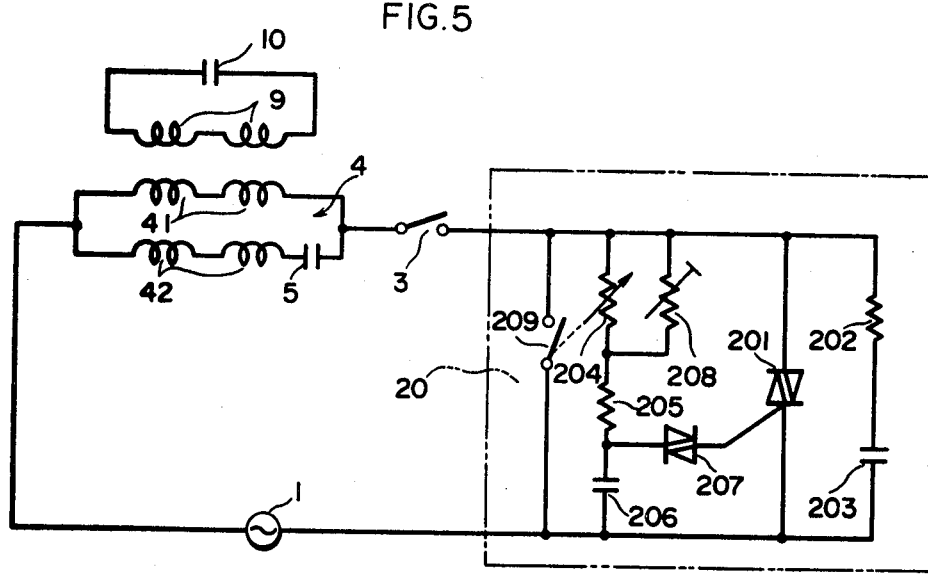
FIG. 5 is a schematic diagram showing one embodiment of the present invention.

FIG. 5 is a schematic diagram showing one embodiment of the present invention. A field winding 4 of an induction motor is connected to an alternating current voltage source 1 through a conduction control circuit 20 and a switch 3. The field winding 4 comprises a main winding 41 and an auxiliary winding 42 and a capacitor 5 is connected in series with the auxiliary winding 42. A tertiary winding or a control winding 9 is electromagnetically coupled to the main winding 41. The control winding 9 and a capacitor 10 serving as an impedance means form a closed loop.

The conduction control circuit 20 is formed as a phase control circuit in the embodiment shown and comprises a triac 201. A series connection of a resistor 202 and a capacitor 203 is connected in parallel with the triac 201 for the purpose of preventing erroneous ignition or triggering of the triac 201. A series connection of a variable resistor 204, a resistor 205 and a capacitor 206 is connected in parallel with the alternating current voltage source 1 and the junction of the resistor 205 and the capacitor 206 is connected to the gate of the triac 201 through a two-terminal bidirectional negative resistance element (diac) 207. A semi-fixed resistor 208 is connected in parallel with the variable resistor 204. By changing the resistance value of the variable resistor 204, a time to a threshold voltage of the diac 207 and thus the phase in which an igniting pulse is applied to the gate of the triac 201 can be changed. Thus, the conduction phase of the alternating current voltage obtained from the alternating current voltage source 1 is controlled by the conduction control circuit 20 and the effective value of the voltage being applied to the field winding 4 is changed, whereby the speed control of the induction motor is performed. The slider of the variable resistor 204 is movable in association with the switch 209 so that the switch 209 is turned on when the slider of the variable resistor 204 is brought to the minimum position, with the result that the conduction control circuit 20 is substantially rendered ineffective, whereby the induction motor is run at the maximum speed.

Figure 6:
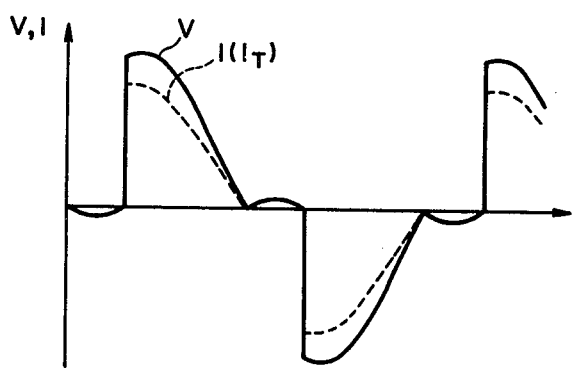
FIG. 6 is a graph showing a voltage-current waveform showing elimination of harmonic distortion and thus elimination of a phase lag in current with respect to a voltage in accordance with the FIG. 5 embodiment.

When a voltage is applied to the field winding 4 through the conduction control circuit 20, as described above, a revolving magnetic field generated by the current $I_M$ flowing through the main winding 41 and the current $I_A$ flowing through the auxiliary winding 42 causes an induced voltage across the control winding 9. Since the control winding 9 and the capacitor 10 both constitute a closed loop, a phase advancing current flows through the control winding 9 due to the above described induced voltage. A voltage-current characteristic on the occasion of conduction of the triac 201 becomes as shown in FIG. 6 due to the induced phase advancing current flowing through the control winding 9, whereby the field winding 4 becomes a pure resistance load with respect to the alternating current voltage source 1. More specifically, the induced current flowing through the control winding 9 becomes a phase advancing current by means of the capacitance component formed with the winding 9 and the capacitor 10 interposed in the closed loop, whereby the voltage-current characteristic on the occasion of conduction of the triac 201 becomes as shown in FIG. 6 due to the phase advancing current, wherein the phase lag of the current has been eliminated. Thus, according to the FIG. 5 embodiment, the phase lag of the current caused in the FIG. 1 conventional circuit as compared with the voltage is eliminated and as a result the field winding 4 becomes a pure resistance load with respect to the alternating current voltage source 1. This will be described in the following in some detail with reference to the vector diagrams shown in FIGS. 7 and 8.

Figure 1:
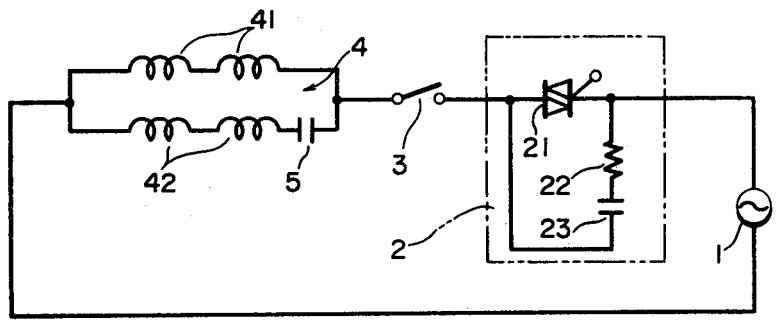
FIG. 1 is a schematic diagram of one example of a conventional induction motor circuit including a conduction control circuit, which constitutes the background of the present invention.
Figure 2:
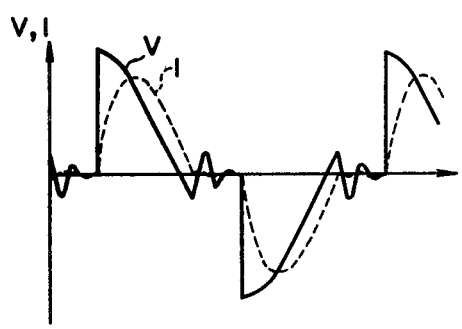
FIG. 2 is a graph showing a voltage-current waveform showing generation of harmonic distortion in the FIG. 1 conventional example.
Figure 3:
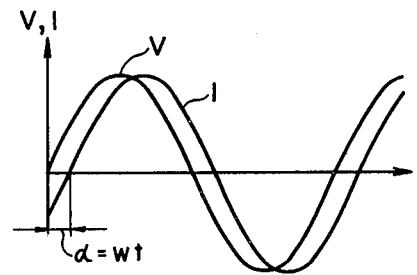
FIG. 3 is a graph showing a voltage-current waveform showing a lag of phase of a current as compared with the voltage in the FIG. 1 conventional circuit.
Figure 4:
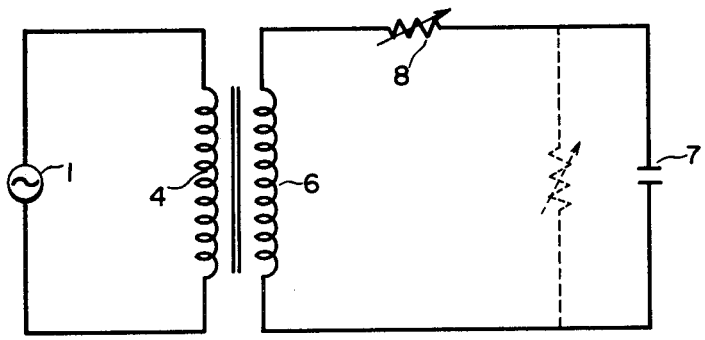
FIG. 4 is a schematic diagram of another example of a conventional induction motor circuit.
Figure 7:
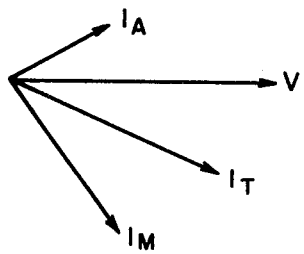
Figure 8:
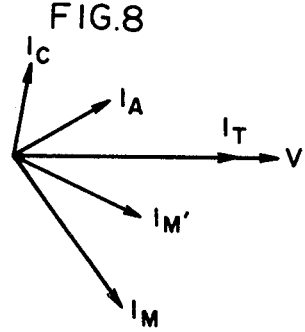

FIG. 7 is a vector diagram showing a relation between the voltage and the current in the FIG. 1 conventional circuit and FIG. 8 is a vector diagram showing a relation between the voltage and the current in accordance with the FIG. 5 embodiment. In the case of the FIG. 1 conventional circuit in which no closed loop (FIG. 5) including the control winding 9 is provided, the current $I_M$ flowing through the main winding 4 lags as compared with the voltage, while the current $I_A$ flowing through the auxiliary winding 42 advances as compared with the voltage. Accordingly, the current $I_T$ flowing through the whole field winding 4 comes to lag as compared with the voltage, as shown in FIG. 7. As a result, the voltage-current characteristic becomes as shown in FIG. 3, as described previously. By contrast, according to the FIG. 5 embodiment, as a result of mutual induction between the main winding 41 and the control winding 9, the current $I_M$ flowing through the main winding 41 advances as shown as $I_M'$ in FIG. 8 due to the phase advancing current $I_C$ flowing through the control winding 9 due to the capacitance component by the control winding 9 and the capacitance of the capacitor 10. Therefore, the composite current $I_T$ of the above described current $I_M'$ and the current $I_A$ flowing through the auxiliary winding 42 consequently becomes of the same phase as that of the voltage V as shown in FIG. 8. Thus the voltage V applied to the field winding 4 and the composite current $I_T$ flowing therethrough become of the same phase and as a result the voltage-current characteristic becomes as shown in FIG. 6.

In the foregoing description, the case where the control winding 9 is electromagnetically coupled to the main winding 41 is described in detail; however, the control winding 9 may be coupled to the auxiliary winding 42 or both of the windings 41 and 42. In other words, the control winding 9 may be coupled to at least a portion of the field winding 4.

The impedance means which is coupled to the control winding 9 to constitute a closed loop may comprise a capacitor as shown in FIG. 5 embodiment; however, the inventors' experimentation indicates that insofar as the control winding 9 involves a capacitance component the control winding 9 per se may be connected directly or through a resistive component.

Figure 9:
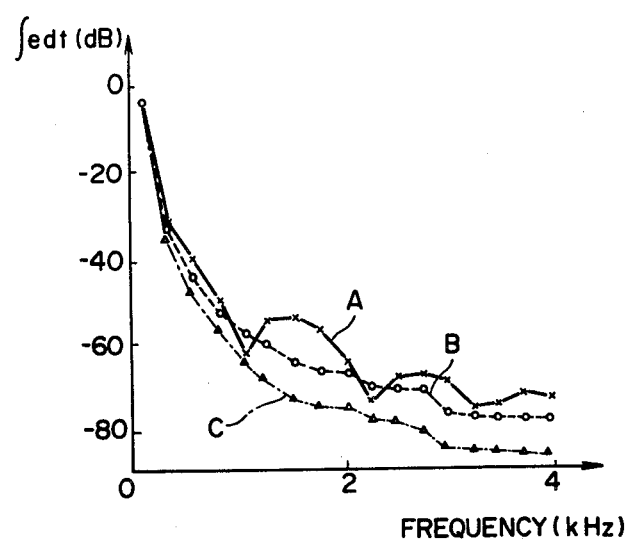
FIG. 9 is a graph for explaining the effect of the FIG. 5 embodiment, in which the abscissa indicates the frequency and the ordinate indicates an integration of the induced voltage.

On the other hand, the vibration of the field of the induction motor is caused due to the magnetic flux distortion occurring therein. Therefore, the inventor confirmed by analyzing the frequency of the integrated waveform (the magnetic flux waveform of the induced voltage by the field winding 4) that the waveform distortion of the magnetic flux causing a noise is decreased by means of the inventive closed loop. The result is shown in FIG. 9. Referring to FIG. 9, the solid line curve A indicates a case where no closed loop is involved at all as shown in the FIG. 1 diagram and the dotted line curve B indicates a case of the FIG. 5 embodiment. Meanwhile, it is pointed out that the one dotted line curve C in FIG. 9 indicates the result of the FIG. 12 embodiment to be described subsequently. As seen in FIG. 9, the FIG. 5 embodiment decreases a harmonic distortion component of the magnetic flux waveform. Presumably, the reason of the same may be accounted for as set forth in the following, in addition to the fact that the above described phase lag of the current is eliminated. More specifically, generally in the case where a phase control is made by means of the conduction control circuit 20 an exciting current for the field winding 4, i.e. the magnetomotive force is turned on or off, which causes involvement of a large harmonic component; however, the current flowing through the inventive closed loop is of the phase different from that in the main winding 41 (the field winding 4), which makes up the vacant period of the field magnetomotive force.

Figure 10:
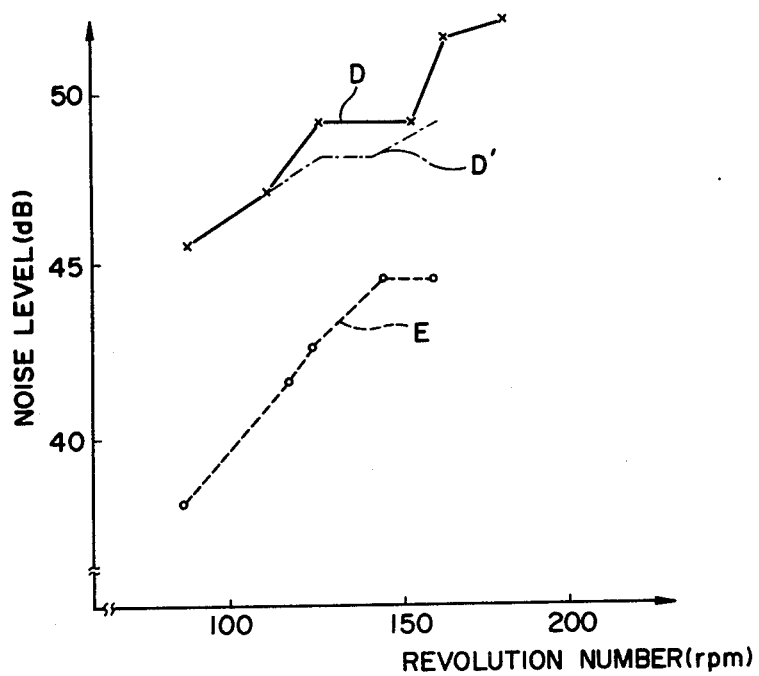
FIG. 10 is a graph for explaining the effect of the FIG. 5 embodiment, wherein the abscissa indicates the number of revolutions and the ordinate indicates a noise level.

As described in the foregoing, reduction of a harmonic component in the field magnetic flux drastically reduced a noise which was hitherto caused from the motor, as shown in FIG. 10. Referring to FIG. 10, the solid line curve D shows a case of the FIG. 1 conventional circuit and the dotted line curve E shows a case of the FIG. 5 embodiment. Meanwhile, the one dotted line curve D' in FIG. 10 shows the result obtained by the measurement with the FIG. 1 conventional circuit, with the diameter of windings of the field winding changed. As seen from FIG. 10, the effect of improving a noise problem by the inventive closed loop is particularly conspicuous in the case of a small number of revolutions. More specifically, an improvement as good as approximately 8 dB was attained in the minimum revolution number region. The effect of reducing a noise in such low speed region is particularly advantageous when an induction motor is utilized in a electric fan, a ceiling fan and the like.

Figure 11:
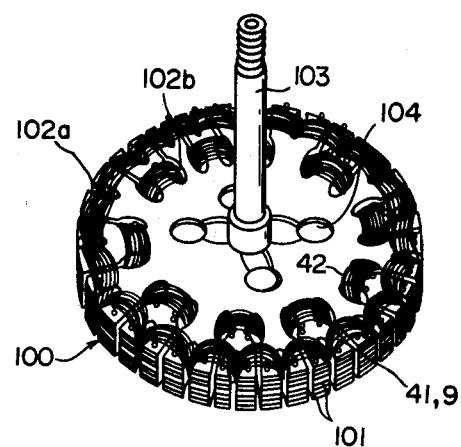
FIG. 11 is a perspective view showing one example a stator of an induction motor in accordance with the FIG. 5 embodiment.

FIG. 11 is a perspective view showing one example of a stator having a control winding in accordance with the present invention. The stator core 100 comprises a plurality of laminations of core plate 101. The stator core 101 includes a predetermined number of first slots 102a and a predetermined number of second slots 102b disposed on the periphery and extending in the radial direction with a different length from the periphery for each of the first and second slots 102a and 102b. The stator core 100 also includes a center aperture in which a metallic pipe 103 is inserted and a plurality of air apertures 104. An insulation film is fitted on the inner wall of each slot of the stator core 100 and similarly an insulating film is also mounted on the end surface of the core 100. The main winding 41 and the auxiliary winding 42 are wound in each of the slots 102a and 102b, respectively. The control winding 9 may be wound in each of the slots 102a at the same time when the main winding 41 is wound. By thus winding the main winding 41 and the control winding 9 in the same slot at the same time, fabricating process can be advantageously simplified.

As described previously, a harmonic component of the magnetic waveform can be reduced by means of the inventive closed loop, whereby the effect of reducing a noise can be brought about. In addition, the closed loop incidentally brings about an improvement of the efficiency and the power factor. The reason may be accounted for by an improvement of the phase lag of the current $I_T$ with respect to the voltage V, as shown in FIGS. 6 and 8. The inventor confirmed through experimentation, as shown in the table, the fact that the efficiency and the power factor are improved by the impedance means, i.e. the capacitance of the capacitor 10 (FIG. 5) constituting the closed loop.

In experimentation a capacitor run motor of 20 poles having the following rating with a fan coupled as a load, was employed.

| winding spec | main winding | $0.28\phi$; 145T × 20 |
|---|---|---|
| | auxiliary winding | $0.25\phi$; 185T × 20 |
| | control winding | $0.28\phi$; 145T × 20 |
| capacitor 5 | 4.0 μF | |
| capacitor 10 | 4.0, 8.0, 12 μF | |
| voltage | 120 V | |
| frequency | 60 Hz | |

TABLE

| capacitance of capacitor 10 μF | number of revolutions rpm | power efficiency % | factor % | output W | input W | current A | lag degree |
|---|---|---|---|---|---|---|---|
| FIG. 1 conventional example | 160 | 11.5 | 96.7 | 10 | 87.0 | 0.75 | 14.8 |
| 4.0 | 160 | 12.6 | 97.4 | 10 | 79.5 | 0.68 | 13.0 |
| 8.0 | 160 | 13.3 | 99.2 | 10 | 75.0 | 0.63 | 7.2 |

TABLE-continued

| capacitance of capacitor 10 μF | number of revolutions rpm | power | | out- put W | input W | cur- rent A | lag degree |
| --- | --- | --- | --- | --- | --- | --- | --- |
| | | effi- ciency % | fac- tor % | | | | |
| 12.0 | 160 | 13.6 | 100.0 | 10 | 73.5 | 0.61 | 0 |

From the Table, it is seen that the power factor and the efficiency are improved when a closed loop including the control winding 9 is provided and, by properly selecting the capacitance of the capacitor 10, the power factor can be made to be 100%.

Figure 12:
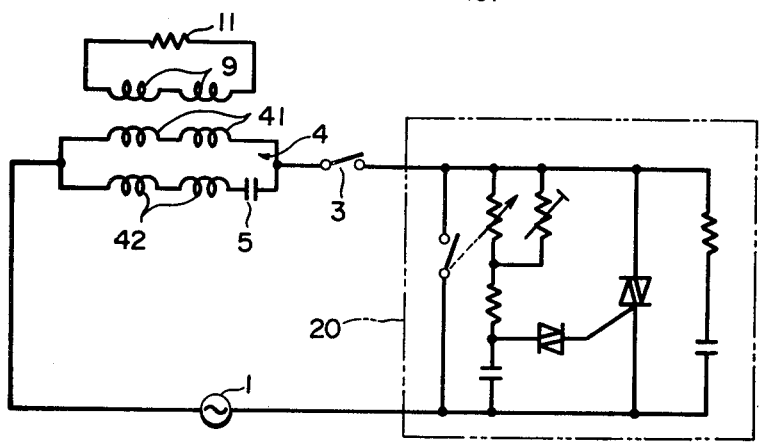
FIG. 12 is a schematic diagram of another embodiment of the present invention.

FIG. 12 is a schematic diagram showing a further embodiment of the present invention. The FIG. 12 embodiment is different from the FIG. 5 embodiment in that a resistor 11 is utilized in place of a capacitor serving as an impedance means which, together with the control winding 9, constitutes a closed loop.

It has been confirmed by the inventor's experimentation that even in the case where the impedance of the impedance means constituting the closed loop is approximately zero, i.e. the control winding 9 is directly coupled at both ends thereof, the effect of reducing a noise can be brought about as in the case of the FIG. 5 embodiment. The reason is believably that a harmonic component of the magnetic flux waveform can be effectively removed by a capacitance component incidental to the control winding.

In the FIG. 12 embodiment a resistor 11 is interposed as an impedance means, so that heat is prevented from being generated by the control winding 9. In the case where the impedance of the impedance means is selected to be approximately zero as described in the foregoing, the diameters of the control winding and the field winding can not be selected to be so thick in the light of a relation with the space factor in the slots and hence the winding resistances are increased, which could cause heat. By contrast, the FIG. 12 embodiment has been adapted such that the resistor 11 is interposed so that heat is generated by the resistor 11, whereby heat generated in the control winding 9 is reduced. Meanwhile, in the case where the resistor 11 is employed as an impedance means which, together with the control winding 9, constitutes a closed loop, a noise being generated from a motor can be more reduced. By employing the resistor 11, a harmonic distortion of the magnetic flux waveform can be further reduced, as shown by the one dotted line curve C in FIG. 9, and consequently, a noise can be more reduced.

Figure 13:
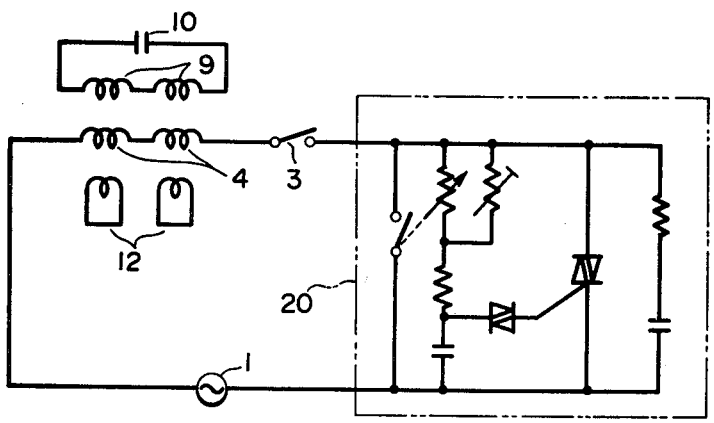
FIG. 13 is a schematic diagram showing a further embodiment of the present invention.

FIG. 13 is a schematic diagram showing still a further embodiment of the present invention. The embodiment shown is of a case where the inventive closed loop is employed in the so-called shading coil induction motor. More specifically, a shading coil 12 is provided in association with the field winding 4, so that a starting torque is generated by the shading coil 12. The control winding 9 is electromagnetically coupled to the field winding 4 and the control winding 9 and an impedance means such as the capacitor 10 altogether constitute a closed loop. It has been confirmed by experimentation that the FIG. 13 embodiment also performs the same effect of reducing a noise as done with the embodiments shown in FIGS. 11 and 12.

Figure 14:
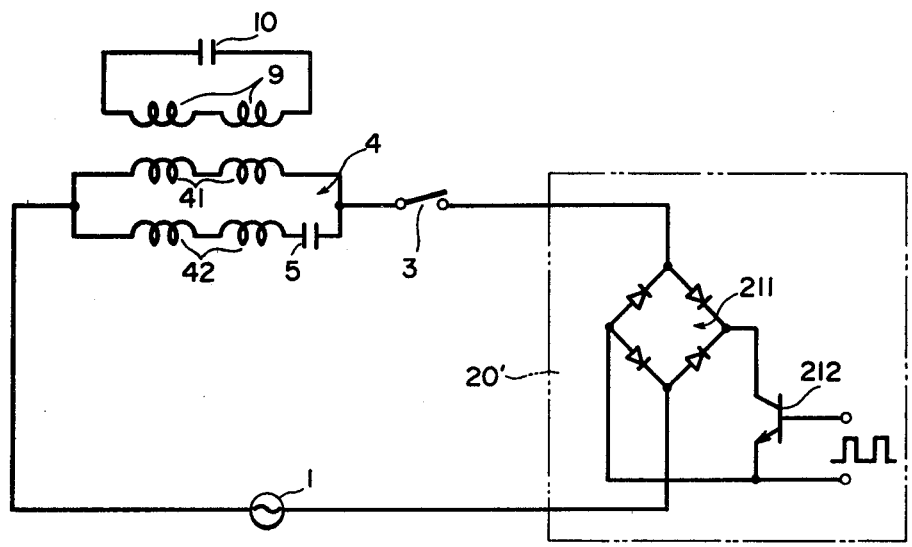
FIG. 14 is a schematic diagram showing still a further embodiment of the present invention.

FIG. 14 is a schematic diagram of still a further embodiment of the present invention. The embodiment shown includes a conduction control circuit 20' which is different from the conduction control circuit 20 of the embodiments previously described. The conduction control circuit 20' comprises a bridge type rectifying circuit 211 and a transistor 212 connected to the rectifying circuit 211. A control pulse from a pulse circuit (not shown) is applied between the base and emitter of the transistor 212. By changing the ratio of the time period (t1) of the high level and the time period (t2-t1) of the low level of the control pulse, it is possible to change the effective voltage being applied to the field winding 4, as shown in FIG. 15, and thus to control the rotational speed of the induction motor.

In the FIG. 14 embodiment as well, it is possible to decrease the lag of the current I with respect to the voltage V by means of the closed loop including the control winding 9 and thus to prevent occurrance of harmonics, thereby to reduce a noise.

Figure 15:
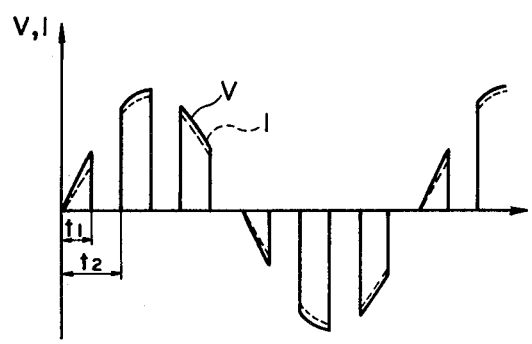
FIG. 15 is a graph showing a voltage-current waveform for explaining the effect of the FIG. 14 embodiment.

In addition, since the rise of a current waveform coincides with the rise of a voltage waveform as shown in FIG. 15, the frequency of a vibration noise (f=1/t2) may be set higher, and thus it is possible to set the frequency of the vibration noise according to the control frequency of the conduction control circuit 20' to be higher than the frequency being offensive to the ears.

The foregoing embodiments were described as embodied in the so-called capacitor run motor and the shading coil induction motor. However, the present invention can be equally applicable to any other types of induction motors such as a capacitor starting starting type induction motor, a phase split type induction motor and the like. The present invention can also be applied not only to a single phase induction motor but also to a multiphase (three-phase) induction motor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An induction motor adapted to be energized by an alternating current voltage source for supplying an alternating current voltage, said induction motor comprising:

conduction control means for controlling conduction of said alternating current voltage to said motor, said conduction control means repetitively interrupting said alternating current voltage thereby changing the effective voltage of said alternating current voltage;

a field winding coupled to said alternating current voltage source through said conduction control means, a control winding electromagnetically coupled to said field winding, and closed loop means coupled to said control winding constituting a closed loop therewith for generating an induced current in said control winding.

2. An induction motor in accordance with claim 1, wherein said conduction control means comprises means for changing the conduction phase of said alternating current voltage.

3. An induction motor in accordance with claim 1, wherein said conduction control means comprises chopper means for chopping said alternating current voltage for application thereof to said field winding.

4. An induction motor in accordance with claim 1, wherein
said closed loop means comprises impedance means interposed in said closed loop and having a predetermined impedance.

5. An induction motor in accordance with claim 4, wherein
said impedance means comprises capacitor means.

6. An induction motor in accordance with claim 4, wherein
said impedance means comprises resistor means.

7. An induction motor in accordance with claim 4, wherein
said impedance means is selected to have an impedance of substantially zero.

8. An induction motor in accordance with any of the preceding claims 1 to 7, wherein
said field winding comprises a main winding, and an auxiliary winding coupled in parallel with said main winding.

9. An induction motor in accordance with claim 8, which further comprises
a capacitor connected in series with said auxiliary winding.

10. An induction motor in accordance with any one of the preceding claims 1 to 7, which further comprises
a shading coil coupled in association with said field winding.

11. An induction motor in accordance with any of the preceding claims 1 to 7, which further comprises a stator, said stator being formed with a plurality of slots for winding said field winding therein, and wherein said control winding is received in at least one of said plurality of slots together with said field winding.

12. An induction motor in accordance with claim 11, wherein
said field winding comprises a main winding and an auxiliary winding connected in parallel with said main winding, and
said control winding is received in at least one of said plurality of slots together with said main winding.

13. A variable speed induction motor adapted to be energized by an alternating current voltage, said induction motor comprising:
conduction control means for controlling conduction of said alternating current voltage to said motor, said conduction control means repetitively interrupting said alternating voltage and thereby changing the effective voltage of said alternating current voltage;
a field winding coupled to said alternating current voltage source through said conduction control means; and
magnetic flux distortion reducing means electromagnetically coupled to said field winding for reducing magnetic flux distortion resulting from said repetitive interruption of said alternating voltage, thereby reducing noise generated by said motor.

14. The motor according to claim 13 wherein said magnetic flux distortion means comprises:
control winding electromagnetically coupled to said field winding; and
closed loop means coupled to said control winding forming a closed loop therewith for generating on induced current in said control winding.

* * * * *

UNITED STATES PATENT AND TRADEMARK OFFICE
CERTIFICATE OF CORRECTION

PATENT NO. : 4,450,399
DATED : May 22, 1984
INVENTOR(S) : Masaru Tanaka

It is certified that error appears in the above-identified patent and that said Letters Patent are hereby corrected as shown below:

Page 1, first column, under heading 30, delete "57-10937(U)" and insert therefor --57-18037(U)--

Signed and Sealed this

Twenty-third Day of October 1984

[SEAL]

Attest:

GERALD J. MOSSINGHOFF

Attesting Officer

Commissioner of Patents and Trademarks